Feb. 6, 1951 P. A. HEISE 2,540,481
SIGNAL FOR MODEL RAILROADS
Filed Dec. 19, 1945
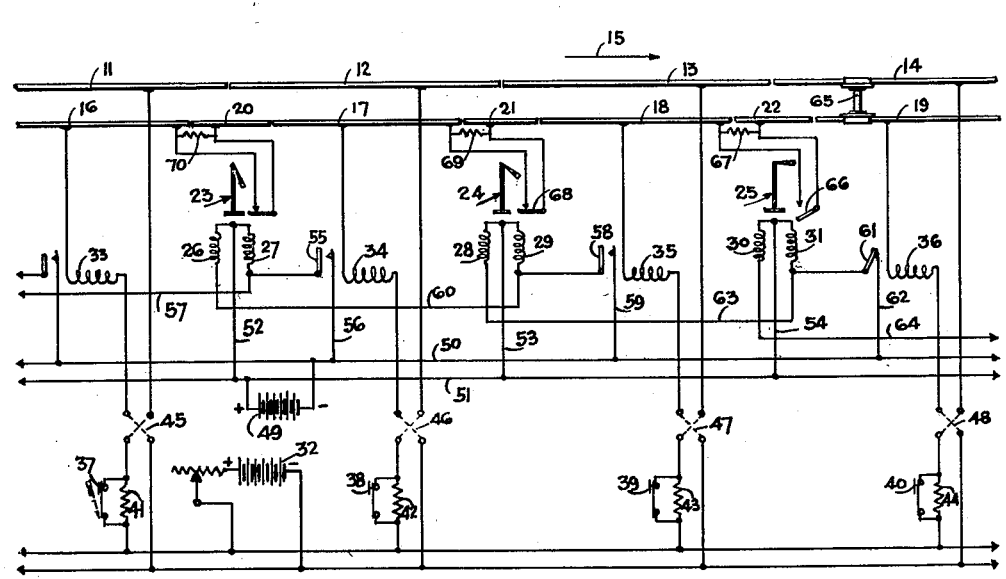
Fig. 1.
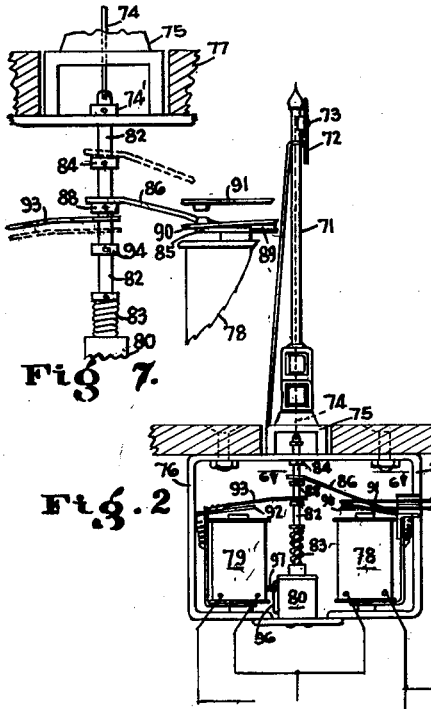
Fig. 7.
Fig. 2.
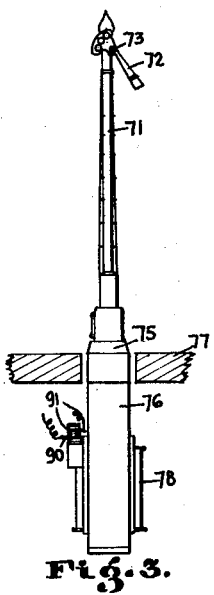
Fig. 3.
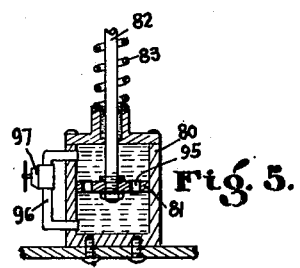
Fig. 4.
Fig. 5.
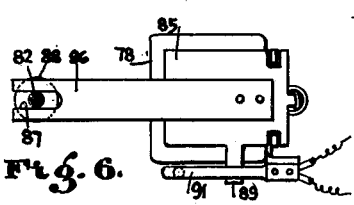
Fig. 6.
INVENTOR
Paul A. Heise.
BY *Robt. L. Dunn*
ATTORNEY Patented Feb. 6, 1951

2,540,481

UNITED STATES PATENT OFFICE 2,540,481

SIGNAL FOR MODEL RAILROADS

Paul Alexis Heise, Pasadena, Calif.

Application December 19, 1945, Serial No. 636,026

3 Claims. (Cl. 246—223)

This invention relates to signals for model railroads and deals particularly with a signal designed to have scale motion as well as scale size.

In model railroading, one of the primary objects of every model railroad operator is to have his models as near like the prototype as possible. Accordingly, every part is scaled down to produce as nearly as possible a miniature facsimile of the original. However, in so doing it often occurs that the motion is not scaled down in the same ratio as the size. This is particularly true in signaling devices. Therefore, it becomes the principal object of this invention to provide a signaling device wherein not only the size of the device is proportional to the original but also the movement is scaled to the size.

More specifically, it is an object of this invention to provide a three-indication semaphore signal for a two-rail one-way traffic system wherein the motion of the signal is scaled down proportionally to the size of the signal.

Another object is to provide a signal of the class described comprising a self-contained unit having relays for operating the signal connected through resilient members to the signal so that a delayed motion may be made to take place in the signal with respect to the action of the relays.

A further object of the invention is to provide in a signal of the character described a dashpot for retarding the motion of the signal.

Other objects and advantages will become apparent as the description proceeds in conjunction with the drawing in which:

Figure 1 is a schematc layout showing the electrical circuit employed in connection with my signal when used on a model railroad;

Figure 2 is an elevation partly in section showing the principal parts of my signaling device;

Figure 3 is an elevation at right angles to Figure 2;

Figure 4 is an enlarged fragmentary view of the top portion of the signal;

Figure 5 is an enlarged sectional view of the dashpot;

Figure 6 is an enlarged view taken on line 6—6 of Figure 2; and

Figure 7 is an enlarged fragmentary view of part of Figure 2 showing a different position of the signal.

Briefly stated, my invention amounts to incorporating in a relay operated semaphore a dashpot for retarding the movement of the semaphore arm in combination with a spring member worked by the relay to store energy in the spring for operating the arm against the dashpot to obtain a motion commensurate with the size of the signal. It is known that signals of this character are used in various ways in model railroading, and for purposes of illustration only I have shown a two-rail one-way traffic system embodying my signal therein.

Referring to Figure 1, where such a system is illustrated, it will be seen that one of the tracks is divided into track sections 11, 12, 13, and 14. It is to be understood that traffic flows in the direction of the arrow 15. However, my signal will work in either direction with minor wiring changes. In connection with the sections just described, there is a right-hand track section associated with each of the sections designated 16, 17, 18, and 19 respectively. Between each of these rail sections just enumerated, I provide what is known as stopping sections 20, 21, and 22. It is to be understood that an ordinary model railroad system comprises any number of these sections. I have shown three complete sections and part of a fourth merely for the purpose of illustrating the operation of the three-indication semaphore signal which is a part of my invention.

In connection with the above track sections, there are associated semaphore signals generally designated 23, 24, and 25. These are the three-indication semaphore type, a better illustration of which is seen in Figure 4. Associated with signal 23 are two relays 26 and 27; with signal 24, relays 28 and 29; and with signal 25, relays 30 and 31.

Power is supplied from a main battery 32 to each of the rail sections 16, 17, 18, and 19 through relays 33, 34, 35, and 36 respectively. As shown, this power is controlled by switches 37, 38, 39, and 40 respectively, each of which is shunted by a resistance 41, 42, 43, and 44. The purpose of this resistance will become apparent later. The switches of course are for energizing the sections of rails previously described. Also, in the power supply to the sections, I may incorporate polarizing switches 45, 46, 47, and 48, which could be used for reversing the traffic in the system, in which case it would be necessary to slightly modify the wiring to operate the signals properly.

Energy is supplied to the signaling system through a common battery 49 connected to bus bars 50 and 51. As shown, relays 26 and 27 are connected by a common conductor 52 to the bus bar 51, while relays 28 and 29 are connected by a common conductor 53 to the bus bar 51, and relays 30 and 31 are connected by a common conductor 54 to the bus bar 51. The other side of relay 27 is connected to a relay operated switch 55, one side of which is connected to the bus bar 50 by conductor 56. A conductor 57 leads from the same end of relay 27 into an adjacent section which is not shown. Referring now to relays 28 and 29, it will be seen that one side of relay 29 leads to a switch 58 having one side thereof connected to the bus bar 50 by conductor 59. The same side of relay 29 also leads to one side of relay 26 through conductor 60. Referring to relays 30 and 31, it will be seen that the wiring is duplicated here and is the same as signals 23 and 24. Here one end of the relay 31 leads to a switch 61, one side of which leads to the bus bar 50 through conductor 62. A conductor 63 connects one end of relay 31 with relay 28 and a conductor 64 leads from one end of relay 30 to a forward section not shown.

To show the operation of the signaling system, let it be assumed that a locomotive represented by trucks 65 is on track section 14. This puts a connection across the rails 14 and 19 and allows current to flow through relay 36. This in turn closes the switch 61 which energizes relay 31, that in turn opens switch 66 and raises the arm of the semaphore 25 to a "stop" position. The opening of the switch 66 breaks the circuit of power to the track section 22 and any locomotive running onto this section would immediately stop due to lack of power. It will be noted that a resistance 67 is shunted across the switch 66. This resistance is small and will not allow sufficient current to flow to operate the locomotive. The purpose of the resistance is to allow only sufficient current to flow to operate a relay in the circuit.

The current flowing through relay 31 also passes through relay 28 which holds the semaphore 24 in a "caution" position. It will be noted that in this setup the switch 68, which is controlled by the relay 29, is not open and that consequently current flows into section 21 so that this section is still a live section. It will also be observed that the semaphore signal 23 is in the "clear" or "go" position.

To sum up, when a locomotive is on track sections 14 and 19, signal 25 is in a "stop" position and track section 22 is dead, signal 24 is in a "caution" position and stopping section 21 is active, while signal 23 is in a "go" position and track section 20 is energized. In connection with switches 37, 38, 39, and 40, it might be stated here that resisters 41, 42, 43, and 44 respectively are for the same purpose as resisters 67 mentioned above; that is, regardless of whether the switches are open or closed, there should be a small amount of current flowing in the system sufficient to operate a small relay but not great enough to operate a locomotive. That is the purpose of these resisters and also resisters 69 and 70.

Referring now to the semaphore itself for a more detailed description of the construction, it will be seen in Figure 2 particularly that I have shown an ordinary three-position semaphore signal comprising a conventional standard 71 having an arm 72 on the upper end thereof in the usual manner. The arm is pivotally mounted on pivot point 73 and is operated through a cable or a rod 74 which swings the arm upward on a downward movement of the rod, better shown in Figure 4. The whole assembly is mounted on a base 75 which in turn is carried upon a supporting member 76 that is suitably attached to the underside of a table top 77 or the like. Mounted in the supporting means 76 are two relays 78 and 79.

Relay 78 corresponds to relays 27, 29, and 31 in Figure 1 and relay 79 corresponds to relays 26, 28, and 30. Supported between the relays 78 and 79 is a dashpot cylinder 80 having a piston 81 reciprocably mounted therein (see Fig. 5). Connected to the piston is a rod 82 having its upper end slidably held in the supporting member 76. The cable 74 is fastened to the upper end of the rod 82 so that any downward movement of the rod will pull the cable and operate the semaphore arm. A spring 83 normally holds the rod in a raised position, which corresponds to the position of the arm shown in Figure 4; that is, the "go" or "clear" position. Any movement of the rod downwardly will operate the signal. To hold the rod in the "go" position, I may mount a small stop member 84 that bears against the frame member 76 and to hold the rod in the "stop" position I may use a small collar 74', best shown in Figure 7. The movement of the rod downwardly is brought about through the operation of the relays 78 and 79.

As shown in Figure 1, switch 61 is closed and relay 31 is energized as soon as a locomotive enters the section guarded by semaphore 25. Since relay 31 corresponds to relay 78, Figure 2, a description of relay 78 will serve the purpose better since it has more detailed construction shown. The energization of the relay 78 pulls down a yieldingly held armature 85 which has a spring finger 86 attached thereto. The finger in turn extends out and straddles the rod 82 in a slot 87 (see Fig. 6). As shown in Figure 2, the finger 86 bears against a collar 88 fixed to the rod 82 so that any downward pressure exerted by the finger will tend to move the rod downwardly.

Referring to Figure 6, it will be seen that the armature plate 85 has a tongue 89 extending from the side thereof beneath the spring fingers 90 and 91 which carry contacts forming a switch that corresponds to switches 66 and 68 in Figure 1. As soon as the armature 85 lowers, it relieves the pressure on the lower member 90 which automatically opens the switch. This position is shown in solid lines in Figure 7 and corresponds to the position of signal 25 in Figure 1.

At the same time that relay 31 is energized, relay 28 is also energized but since relay 28 corresponds to relay 79 in Figure 2, a description of the operation of relay 79 will be entered for the sake of clearness. As relay 79 is energized, it reacts on the armature 92 to pull the same downwardly. The spring finger 93 attached to armature 92 extends out and engages the rod 82 similarly to the finger 86. Likewise, there is a collar 94 attached to the rod 82 which the finger 93 engages to hold the signal in a halfway or "caution" position after the rod has been released by the finger 86.

As a means of controlling the movement of the rod 82, I use the dashpot 80 mentioned hereinbefore. This dashpot is shown as comprising a piston 81 working in the cylinder 80. The piston 81 may be provided with a series of holes 95 which permit a liquid, such as oil contained in the cylinder, to flow therethrough. In addition, I may form a by-pass arrangement comprising a pipe 96 communicating with the cylinder 80 above and below the piston. In the pipe 96, I may incorporate a valve 97. With this arrangement I am enabled to regulate the flow of liquid from one side of the piston to the other and may thereby vary the speed of movement of the piston. The sole purpose of the piston is to retard the movement of the rod 82 in response to the urge of the finger 86. With such an arrangement, the speed of movement of the arm 72 may be so controlled that its motion is scaled to the size of the signal.

I claim:

1. In a semaphore for model railroads, a rod adapted to operate the arm of said semaphore upon longitudinal movement of said rod, a pair of relays adapted to move said rod longitudinally, each of said relays having a spring finger attached to the armature thereof, the outer ends of said fingers engaging said rod and being adapted to exert a yielding force tending to move said rod longitudinally upon energization of said relays, the force exerted by one of said fingers being adapted to move said arm into a "stop" position and the other finger being arranged to hold said semaphore arm in a "caution" position.

2. In a semaphore for model railroads having an arm arranged to be operated by a pull member, a longitudinally slidable rod having one end attached to said pull member and the other end operably connected to a dashpot, and means for yieldingly exerting a force tending to move said rod longitudinally against the retarding action of said dashpot to operate said semaphore arm, said means including a relay having a spring finger attached to the armature thereof arranged to engage said rod at the outer end of said finger and exert a yieldable force tending to move said rod longitudinally upon energization of said relay.

3. In a semaphore signal for model railroads, a pair of relays for operating the semaphore arm thereof, a spring finger mounted upon the armature of each of said relays for translating motion from said relays to yieldably operate said arm, one of said relays being adapted to bring the arm to a "stop" position upon energization of said relay and the other being arranged to hold said arm in a "caution" position upon being energized, and both of said relays being arranged to work against a yieldable resistance for retarding the movement of said arm.

PAUL ALEXIS HEISE.

REFERENCES CITED

The following references are of record in the file of this patent:

UNITED STATES PATENTS

| Number | Name | Date |
|---|---|---|
| 801,543 | Patenall et al. | Oct. 10, 1905 |
| 856,273 | Macomber | June 11, 1907 |
| 910,911 | Craft | Jan. 26, 1909 |
| 921,625 | Phelps | May 11, 1909 |
| 1,057,038 | Cook | Mar. 25, 1913 |
| 1,427,881 | Wessel | Sept. 5, 1922 |
| 1,744,794 | Pohlmann et al. | Jan. 28, 1930 |
| 1,775,422 | Conti | Sept. 9, 1930 |
| 1,966,031 | Handy | July 10, 1934 |
| 2,088,174 | Paullin, Jr. | July 27, 1937 |

FOREIGN PATENTS

| Number | Country | Date |
|---|---|---|
| 20,786 | Great Britain | Sept. 19, 1896 |